(12) United States Patent
Chun

(10) Patent No.: US 9,200,770 B2
(45) Date of Patent: Dec. 1, 2015

(54) SOLAR LIGHT ASSEMBLY

(76) Inventor: Alice M. Chun, New York, NY (US)

( * ) Notice: Subject to any disclaimer, the term of this patent is extended or adjusted under 35 U.S.C. 154(b) by 840 days.

(21) Appl. No.: 13/450,974

(22) Filed: Apr. 19, 2012

(65) Prior Publication Data

US 2012/0224359 A1 Sep. 6, 2012

Related U.S. Application Data

(63) Continuation-in-part of application No. 13/163,239, filed on Jun. 17, 2011.

(60) Provisional application No. 61/356,274, filed on Jun. 18, 2010.

(51) Int. Cl.
| | |
|---|---|
| *F21L 4/00* | (2006.01) |
| *F21S 8/00* | (2006.01) |
| *B65D 6/16* | (2006.01) |
| *F21S 9/03* | (2006.01) |
| *F21V 17/00* | (2006.01) |
| *F21W 131/10* | (2006.01) |
| *F21Y 101/02* | (2006.01) |

(52) U.S. Cl.
CPC ... *F21S 8/00* (2013.01); *B65D 7/24* (2013.01); *F21S 9/037* (2013.01); *F21V 17/007* (2013.01); *F21W 2131/1005* (2013.01); *F21Y 2101/02* (2013.01)

(58) Field of Classification Search
CPC ............... F21S 8/00; F21S 9/03; F21S 9/037; F21V 17/007
See application file for complete search history.

(56) References Cited

U.S. PATENT DOCUMENTS

| | | | | |
|---|---|---|---|---|
| 3,553,866 | A * | 1/1971 | Redford et al. ................. | 40/364 |
| 5,231,781 | A * | 8/1993 | Dunbar .......................... | 43/17.5 |
| 2006/0193126 | A1* | 8/2006 | Kuelbs et al. ................. | 362/155 |
| 2006/0279956 | A1* | 12/2006 | Richmond ..................... | 362/374 |
| 2007/0025649 | A1* | 2/2007 | Chindavong .................. | 383/121 |
| 2008/0175005 | A1* | 7/2008 | Kellmann et al. ............. | 362/352 |
| 2008/0266860 | A1* | 10/2008 | Marcinkewicz et al. ...... | 362/253 |
| 2008/0273319 | A1* | 11/2008 | VanderSchuit ............... | 362/101 |
| 2009/0269045 | A1* | 10/2009 | Astill ............................. | 396/3 |
| 2014/0118997 | A1* | 5/2014 | Snyder .......................... | 362/183 |

* cited by examiner

*Primary Examiner* — Peggy Neils
*Assistant Examiner* — Alexander Garlen
(74) *Attorney, Agent, or Firm* — Brenda Pomerance

(57) ABSTRACT

A solar light assembly including an expandable bladder and a solar rechargeable light assembly.

14 Claims, 13 Drawing Sheets

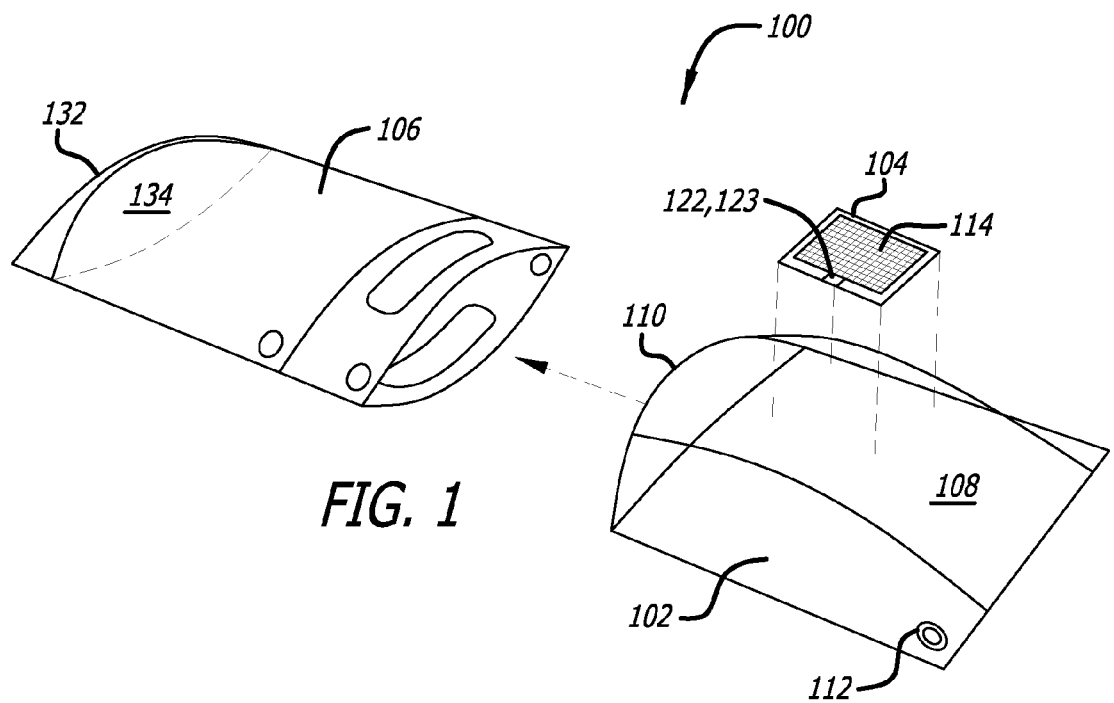
FIG. 1
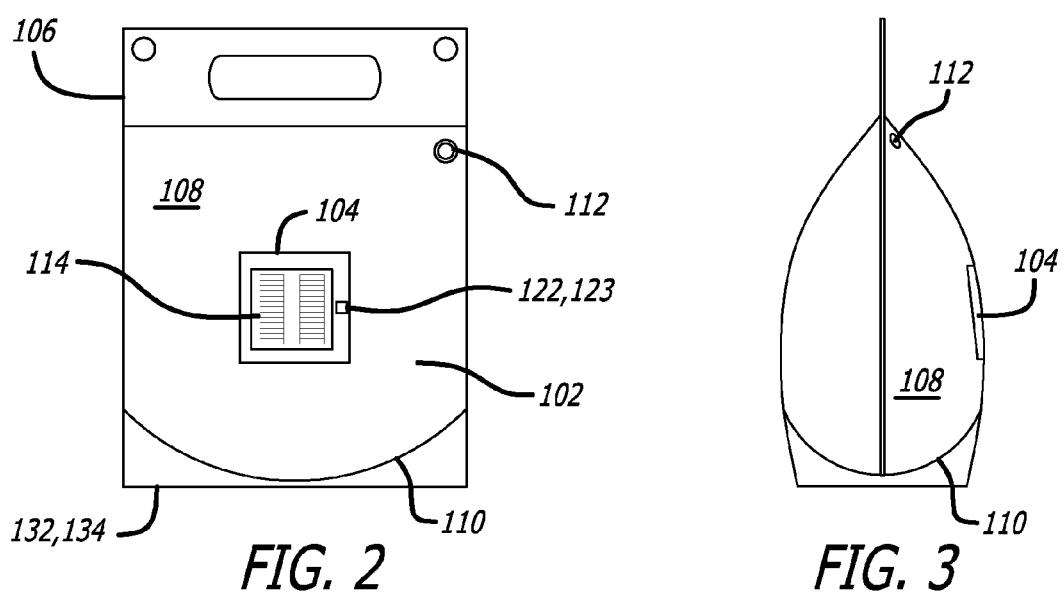
FIG. 2
FIG. 3

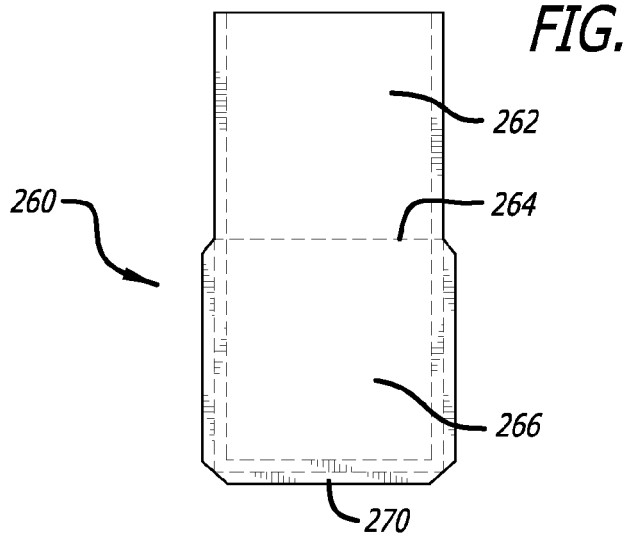
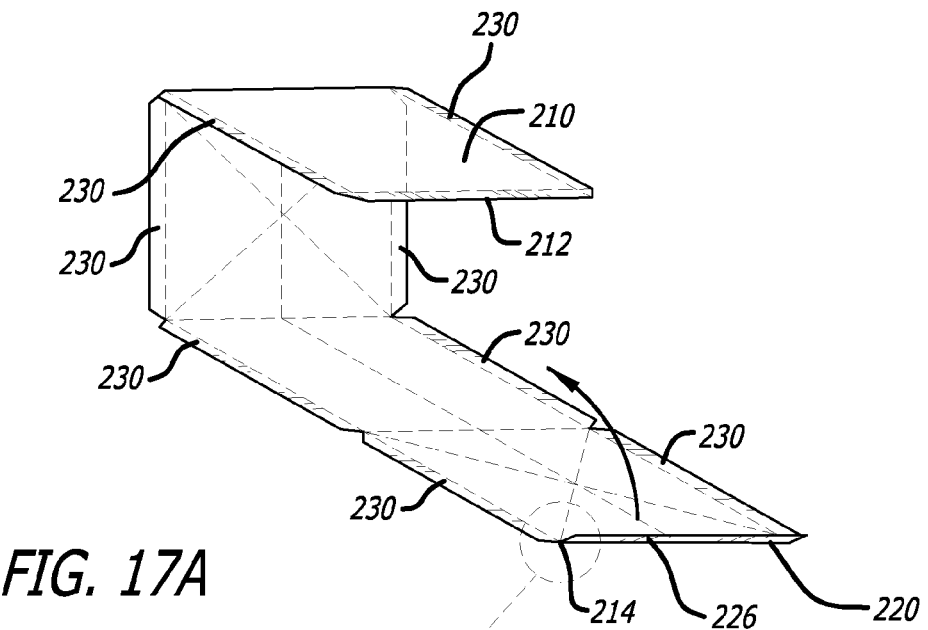
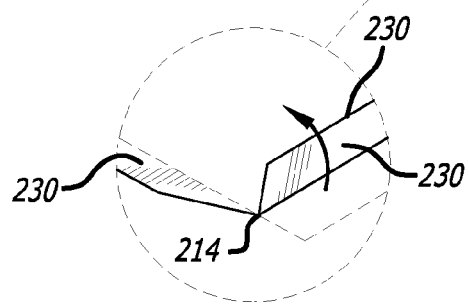

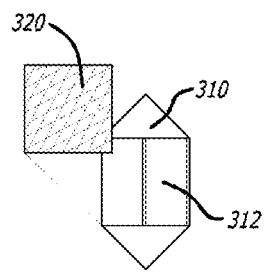
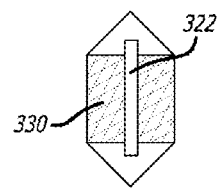
FIG. 23A          FIG. 23B
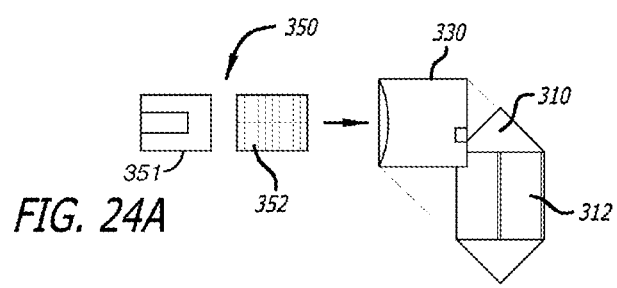
FIG. 24A
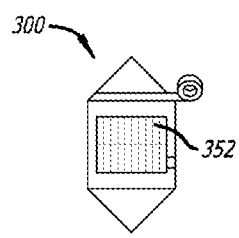
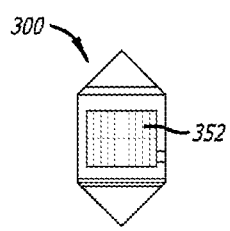
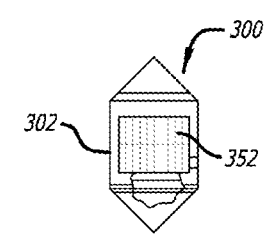
FIG. 24B          FIG. 24C          FIG. 24D

SOLAR LIGHT ASSEMBLY

CROSS REFERENCE TO RELATED APPLICATIONS

This application is a continuation-in-part of U.S. application Ser. No. 13/163,239, filed Jun. 17, 2011, and claims the benefit of U.S. Provisional Application No. 61/356,274, filed Jun. 18, 2010, which is incorporated by reference as if disclosed herein in its entirety.

BACKGROUND

The present disclosure is directed towards a light assembly, and more particularly, to a rechargeable solar light device. Sustainable lighting solutions are essential to relief efforts in areas affected by natural disasters, war, and other events that leave large areas without electricity. Rechargeable batteries coupled to photo voltaic cells are an ideal sustainable approach to providing light when the sun goes down. Current solar-charged light solutions are expensive and difficult to transport which make them costly to deploy in large numbers.

Battery- or fuel-powered lighting solutions have the obvious disadvantage of recurring cost and limited resources. On the other hand, most renewable lighting solutions require expensive components and are large and difficult to ship.

Therefore, what is needed and heretofore lacking in prior lighting solutions is a lighting device that can be easily shipped and stored, and which embodies relatively inexpensive components.

The present disclosure addresses these and other needs.

SUMMARY

Briefly and in general terms, the present disclosure is directed towards an expandable solar light assembly. In one aspect, the expandable solar light assembly includes an expandable bladder and a solar rechargeable light assembly. The assembly can further include a reflective surface positioned opposite a light generating assembly to enhance luminosity of the light assembly.

Some embodiments of the disclosed subject matter include a solar rechargeable light that is expandable for use and collapsible for packing. In some embodiments, the solar light includes the following: an expandable inner bladder including at least front and bottom surfaces; a solar rechargeable light assembly joined with the front surface of the inner bladder, the assembly including a photovoltaic panel, a battery charger in electrical communication with the photovoltaic panel, a rechargeable battery in electrical communication with the battery charger, and a light emitting diode in electrical communication with the rechargeable battery; and an expandable outer bladder configured to contain the inner bladder. The inner and outer bladders are substantially transparent, flexible, inflatable, and collapsible.

In another approach, a solar light assembly includes subassemblies which are joined to form an expandable bladder. The bladder can be self-expanding or can be expanded from a collapsed configuration by injecting a medium within the bladder.

In one specific embodiment, an expandable bladder defines a generally rectangular prism and is formed from three subassemblies. A first assembly embodies a tri-fold sleeve structure, and second and third assemblies are attached to the sleeve to create an enclosed bladder. In another specific embodiment, an expandable bladder is formed from a sleeve which is folded to define a flattened six sided structure, with open opposite flat sides. The openings in the flat sides are covered by second and third assemblies to enclose the structure and form the bladder.

The contemplated expandable bladder can further include a power supply, a power storage device, and a display component. A life cycle of ten years is further contemplated for the power supply and the power supply can embody rechargeable batteries with a life cycle of up to or more than 1000 charging times. The assembly can also be configured to provide eight to ten hours of working time.

Other features and advantages of the present disclosure will become apparent from the following detailed description, taken in conjunction with the accompanying drawings, which illustrate, by way of example, the principles of the invention.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein:

FIG. 1 is a front isometric exploded view of a solar light according to some embodiments of the disclosed subject matter;

FIG. 2 is a front view of a solar light according to some embodiments of the disclosed subject matter;

FIG. 3 is a side view of a solar light according to some embodiments of the disclosed subject matter;

FIG. 16 is a plan view, depicting a third assembly of an expandable bladder;

FIGS. 17A-B are perspective views, depicting the forming of the first assembly shown in FIG. 14;

FIGS. 23A and B are plan views, depicting the assembly of a light differing element to the expandable bladder of FIGS. 22A-E; and FIGS. 24A-D are plan views, depicting the assembly of a solar assembly to the expandable bladder of FIGS. 22A-E.

DETAILED DESCRIPTION OF THE PREFERRED EMBODIMENTS

Figure 4:
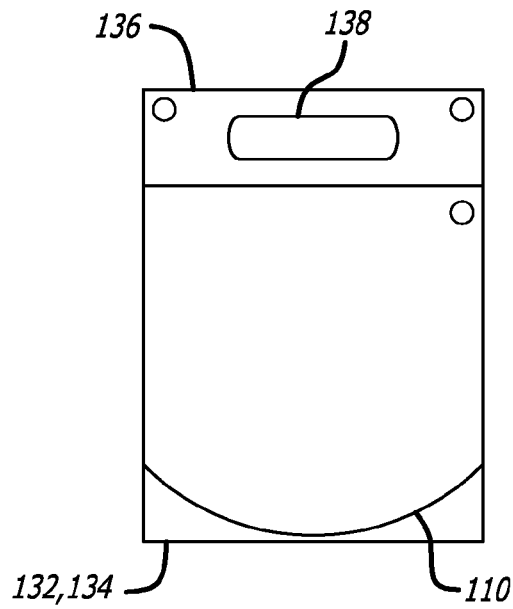
FIG. 4 is a front view of an outer bladder of a solar light according to some embodiments of the disclosed subject matter.
Figure 5:
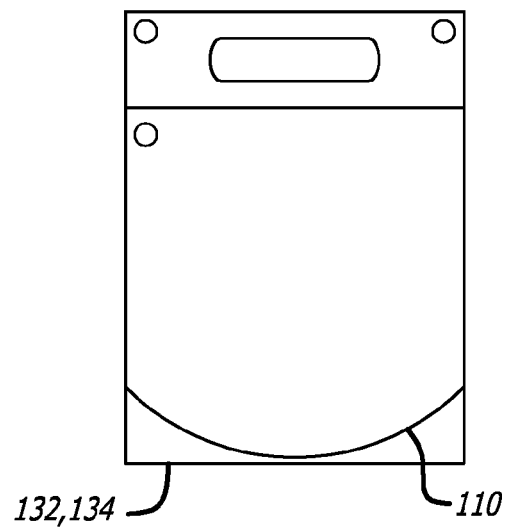
FIG. 5 is a back view of an outer bladder of a solar light according to some embodiments of the disclosed subject matter.
Figure 6:
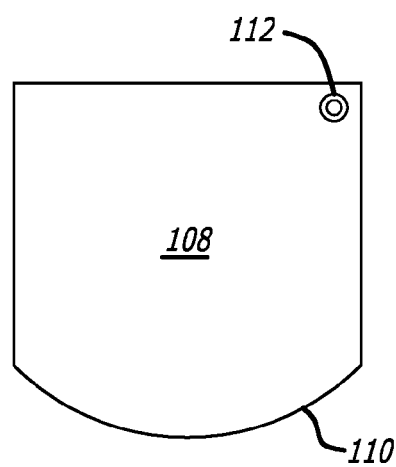
FIG. 6 is a front view of an inner bladder of a solar light according to some embodiments of the disclosed subject matter.
Figure 7:
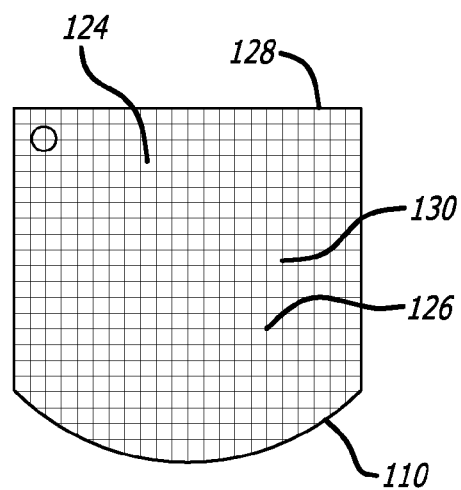
FIG. 7 is a back view of an inner bladder of a solar light according to some embodiments of the disclosed subject matter.
Figure 8:
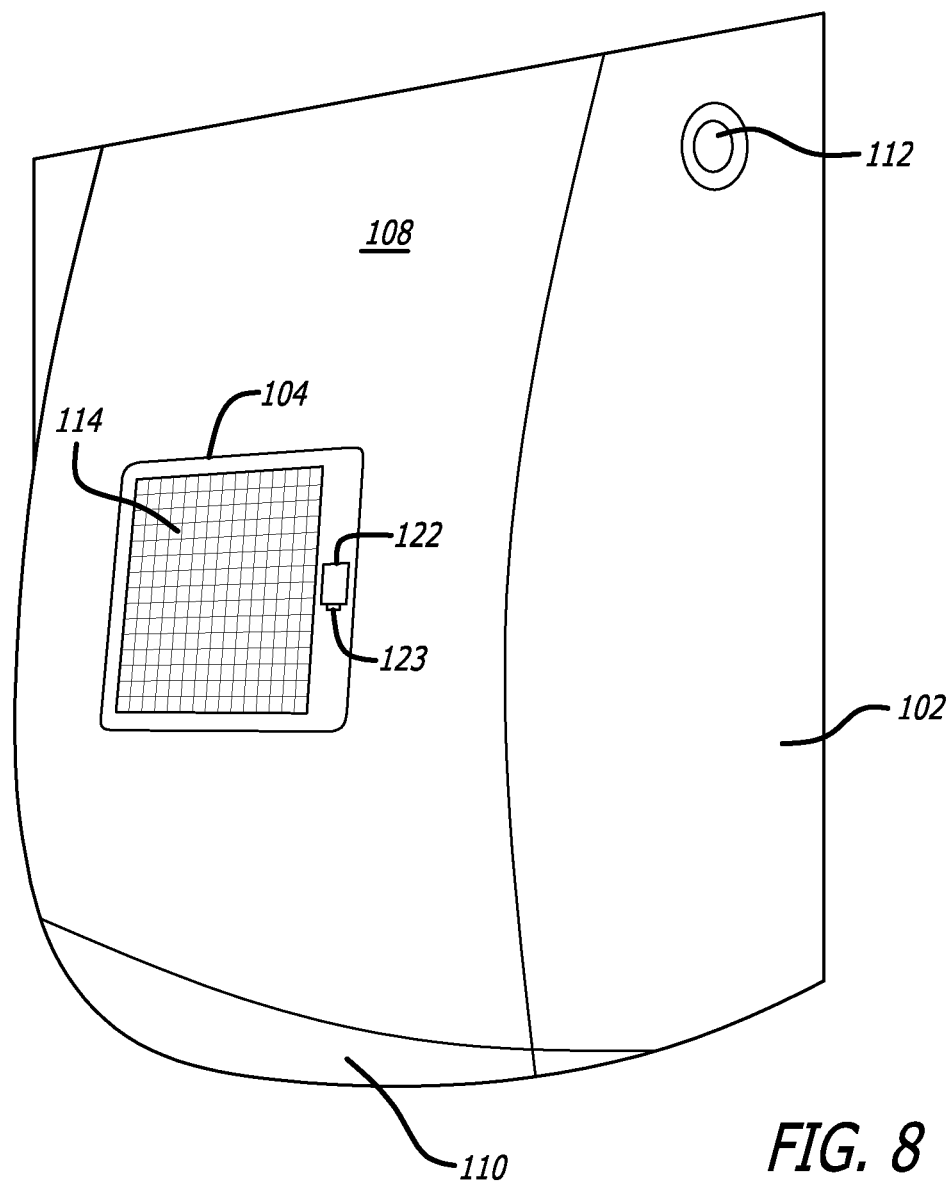
FIG. 8 is a front isometric view of an inner bladder of a solar light according to some embodiments of the disclosed subject matter.
Figure 9:
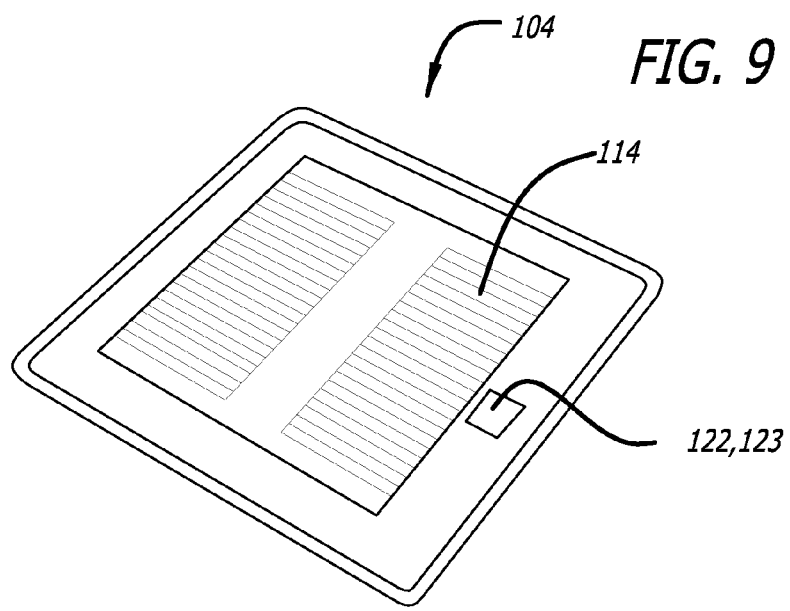
FIG. 9 is a front isometric view of a light assembly of a solar light according to some embodiments of the disclosed subject matter.
Figure 10:
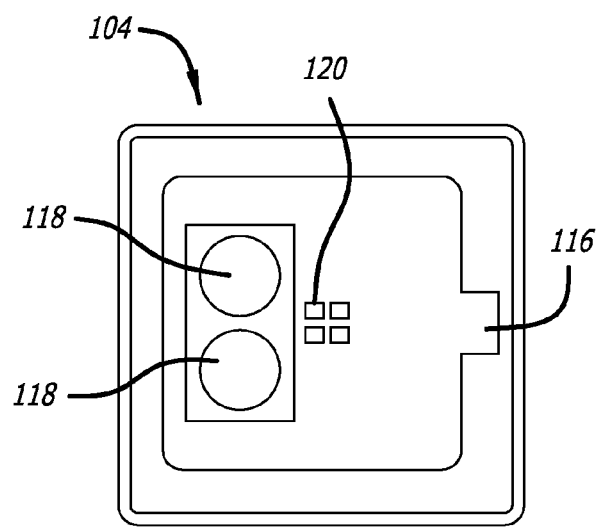
FIG. 10 is a front view of a light assembly of a solar light according to some embodiments of the disclosed subject matter.
Figure 11:
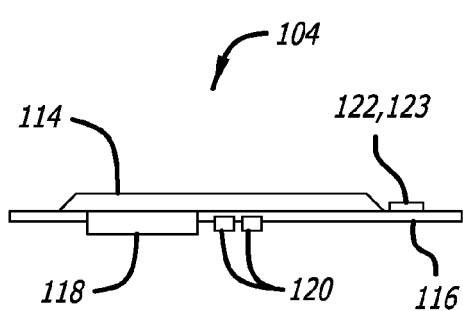
FIG. 11 a side view of a light assembly of a solar light according to some embodiments of the disclosed subject matter.

Referring now to FIGS. 1-13, aspects of the disclosed subject matter include a solar rechargeable light 100 including an inner bladder 102, a solar rechargeable light assembly 104, and an outer bladder 106. Light 100 is expandable by filling inner bladder 102 with a gas, liquid, or solid.

In some embodiments, inner bladder 102 has at least front surfaces 108 and 110, respectively. In some embodiments, inner bladder 102 includes a valve 112 through which the inner bladder can be expanded and collapsed by inflating or filling and deflating or emptying, respectively. Inner bladder 102 is typically filled with one or more of a gas, e.g., air, liquid, and solid.

As best shown in FIGS. 1-3 and 9-11, solar rechargeable light assembly 104 is joined with front surface 108 of said inner bladder 102. Solar rechargeable light assembly 104 includes a photovoltaic panel 114, a battery charger 116 in electrical communication with the photovoltaic panel, one or more rechargeable batteries 118 in electrical communication with the battery charger, and one or more light emitting diodes (LED) 120 in electrical communication with the rechargeable batteries. Battery charger 116 typically includes an integrated circuit chip with overcharge control. In some embodiments, rechargeable batteries 118 include two 3.7 volt coin cell batteries. Of course, other size batteries are contemplated depending on the particular application.

In some embodiments, assembly 104 includes more than one LED 120, e.g., four LEDs, in electrical communication with rechargeable batteries 118. Embodiments including more than one LED 120 typically have an increased viewing angle, e.g., four LEDs provides about a 100 to 120 degree viewing angle, which provide approximately 30-40 lumens of light. In some embodiments assembly 104 includes a power switch 122 in electrical communication with rechargeable batteries 118 and LEDs 120. Switch 122 is configured to selectively introduce and prevent the flow of electricity from batteries 118 to LEDs 120. Switch 122 is configured so that a user can control the amount of light output by light 100, e.g., includes off, low, high settings. This can be achieved in at least two ways. First, where there is more than one LED 120, switch 122 can be configured so as to selectively introduce and prevent the flow of electricity from batteries 118 to a desired number of LEDs 120. Alternatively, regardless of the number of LEDs 120, switch 122 can be configured to selectively regulate the flow of electricity from the batteries to the LEDs. In some embodiments, switch 122 is configured to prevent accidental turn-on, e.g., has enough resistance to being switched and is concave. Some embodiments include charging lights 123 for indicating whether batteries 118 are charged, e.g., a red LED for indicating that the batteries are not charged and a green LED for indicating that the batteries are fully charged. Charging lights 123 are in communication with battery charger 116. In some embodiments, depending on the size of thin-film photovoltaic 114, strength of batteries 118, and number of LEDs 120, the batteries will provide enough power to energize the LEDs for 8 hours on a low setting and 4-6 hours on a high setting, and the batteries will recharge after 5-8 hours in the sun.

Referring now to FIGS. 1-7, outer bladder 106, which is also expandable, is configured to contain inner bladder 102. One or more of inner bladder 102 and outer bladder 106 is typically fabricated from a frosted plastic material or similar to promote diffusion of light from LEDs 120. One or more of inner bladder 102 and outer bladder 106 typically includes one or more surfaces 124 having a particular pattern 126 configured to promote diffusion of light from LEDs 120. In some embodiments, pattern 126 includes a white background portion 128 having a grid of transparent portions 130 thereby defining an about thirty percent transparent white pattern. Outer bladder 106 is typically sealable so that light 100 both floats and is substantially waterproof. In some embodiments, outer bladder 106 includes a bottom portion 132 that has a flat bottom surface 134 and a top portion 136 defining a handle 138. As assembled, bottom surface 110 of inner bladder 102 rests on or is adjacent to bottom surface 134. Flat bottom surface 134 generally allows light 100 to be positioned so as to stand in an upright position. Both outer bladder 106 and inner bladder 102 are generally fabricated from materials that are substantially transparent, flexible, inflatable, and collapsible.

Figure 12:
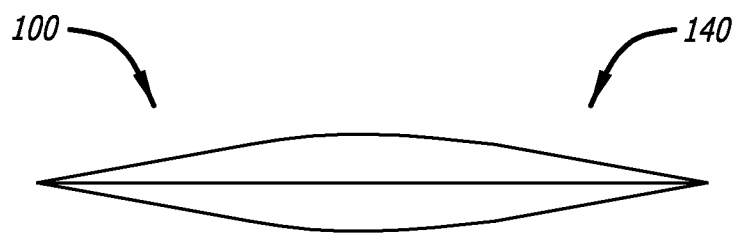
FIG. 12 a side view of a solar light according to some embodiments of the disclosed subject matter in a first, collapsed state.
Figure 13:
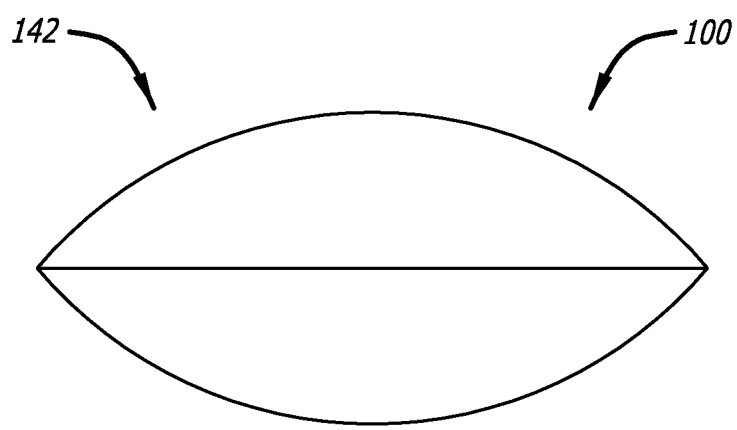
FIG. 13 a side view of a solar light according to some embodiments of the disclosed subject matter in a second, expanded state.
Figures 14, 15:
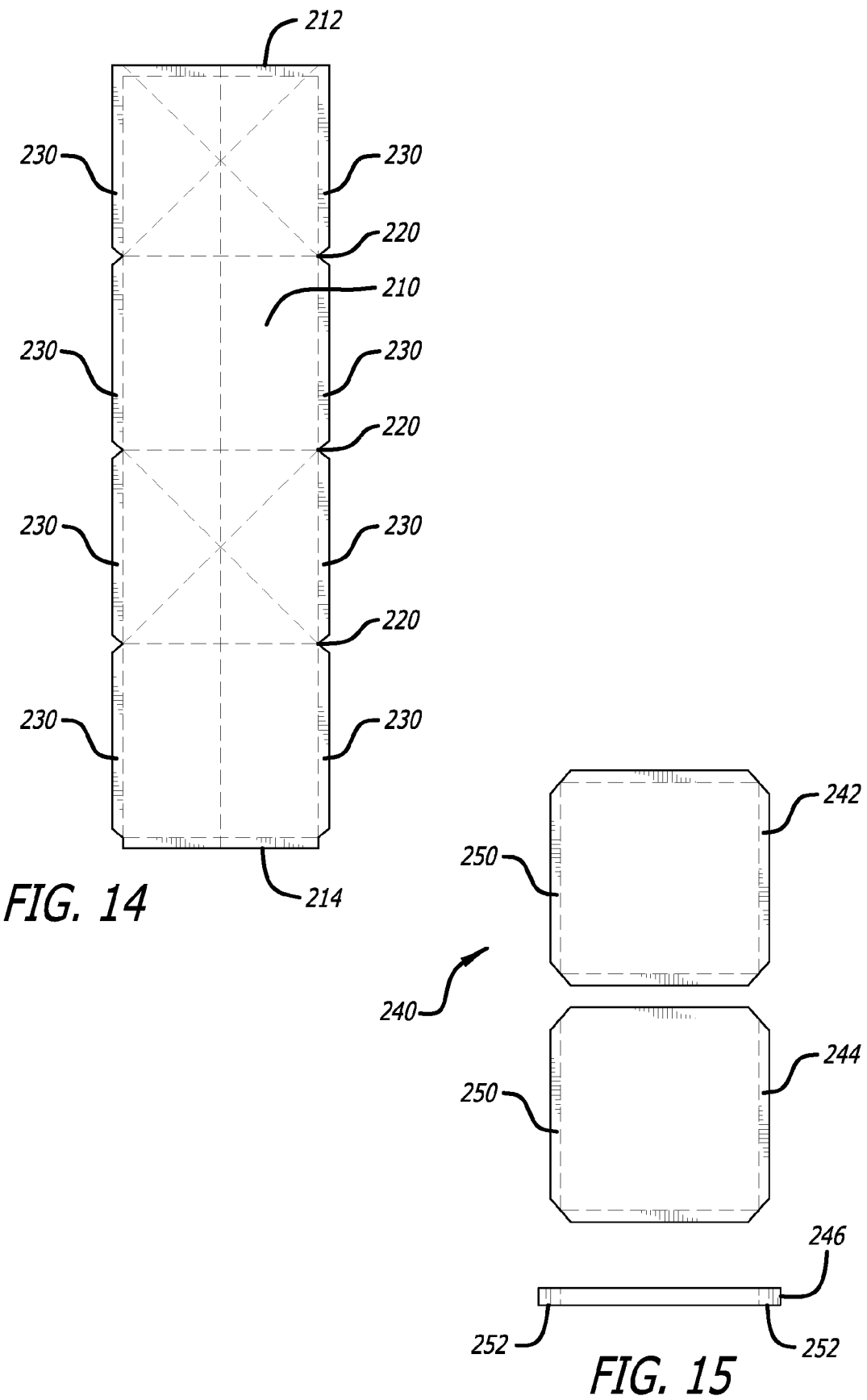
FIG. 14 is a plan view, depicting a first assembly of an expandable bladder.
FIG. 15 is a plan view, depicting a second assembly of an expandable bladder.
Figure 17B:
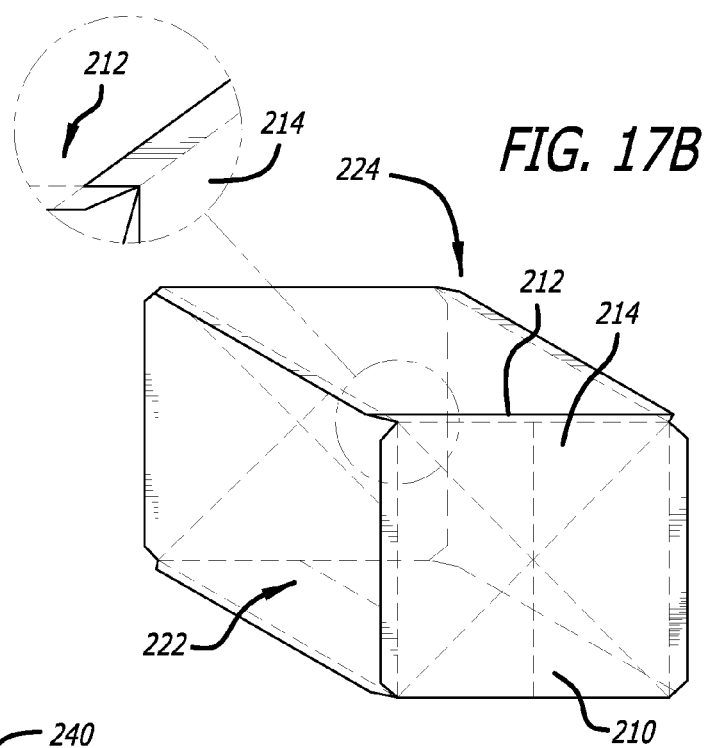
Figure 18A:
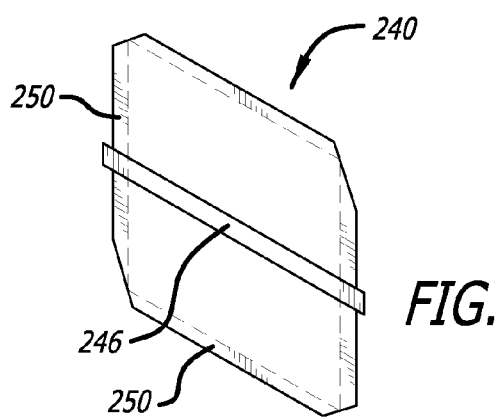
FIGS. 18A and B are perspective views, depicting the second assembly of FIG. 15 and an exploded view thereof.
Figure 18B:
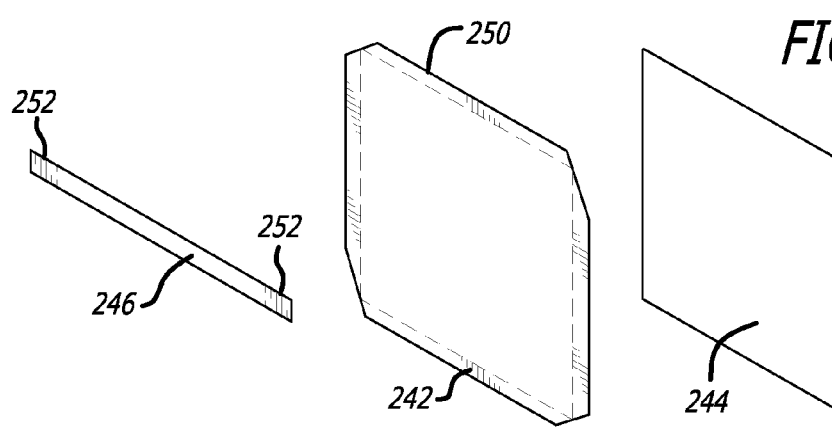
Figure 19A:
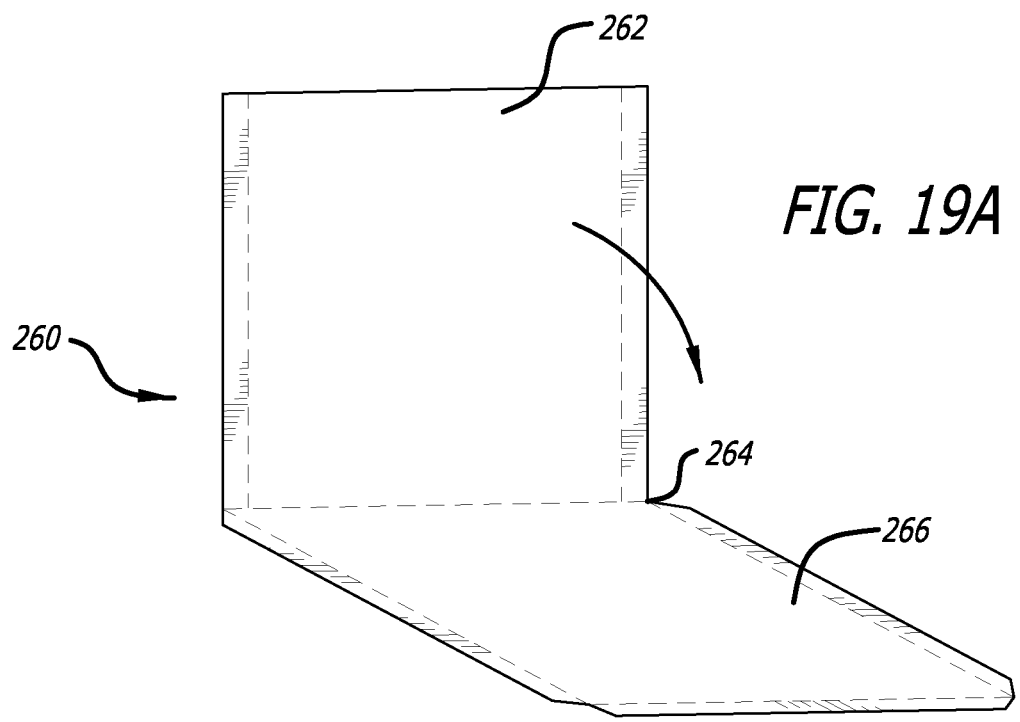
FIGS. 19A and B are perspective views, depicting the forming of the third assembly shown in FIG. 16.
Figure 19B:
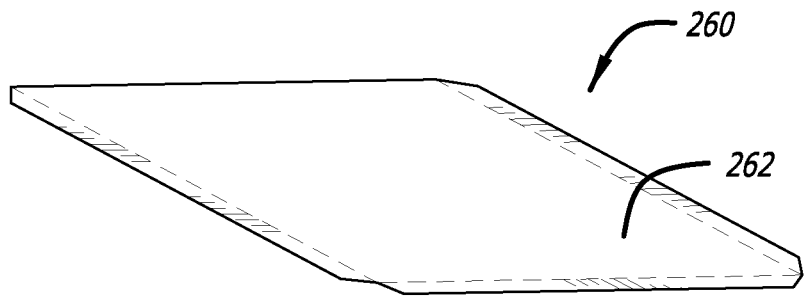

Referring now to FIGS. 12 and 13, in use, light 100 is configured so as to have first and second states 140 and 142, respectively. In first state 140, inner bladder 102 is substantially free of gas, liquids, and solids and light 100 is substantially collapsed. In second state 142, inner bladder 102 includes one or more of a gas, liquid, and solid and light 100 is substantially expanded.

Figure 20A:
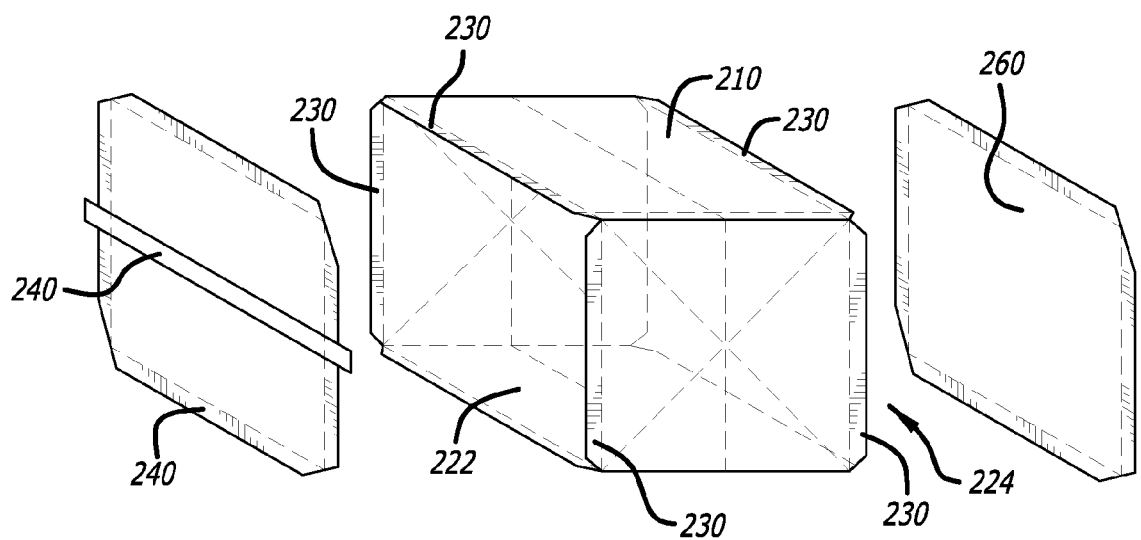
FIGS. 20A and B are perspective views, depicting another embodiment of an assembled expandable bladder.
Figure 20B:
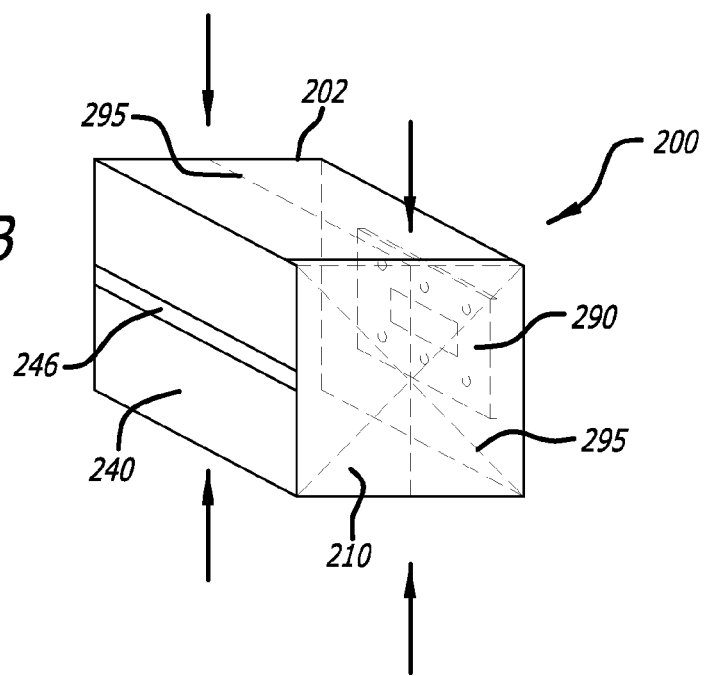
Figure 21A:
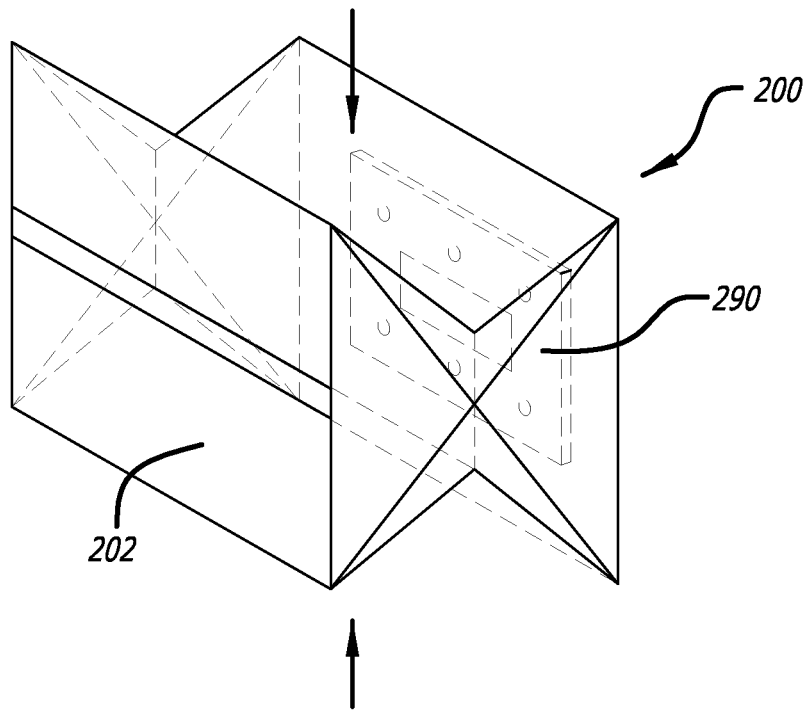
FIGS. 21A and B are perspective and side views, depicting a collapsed configuration of the assembly of FIG. 20.
Figure 21B:
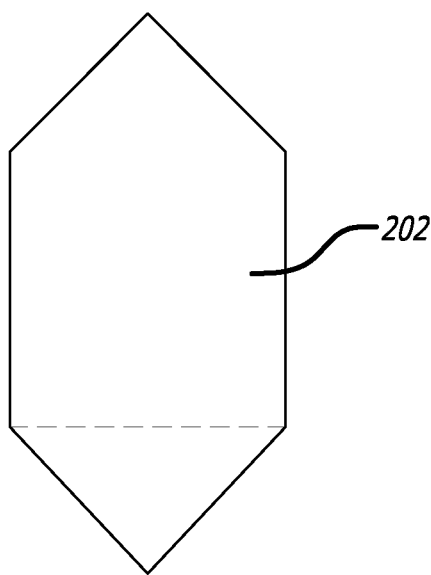
Figure 22A:
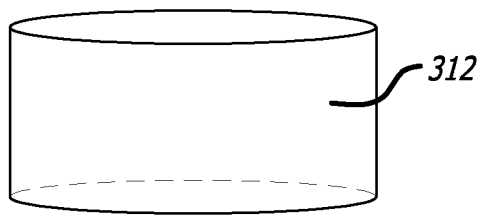
FIGS. 22A-E are side views, depicting the formation of an expandable bladder of a further embodiment of an expandable solar light assembly.
Figure 22B:
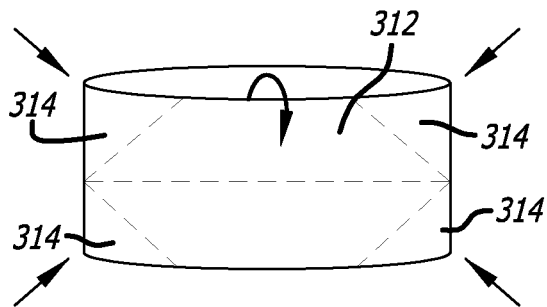
Figure 22C:
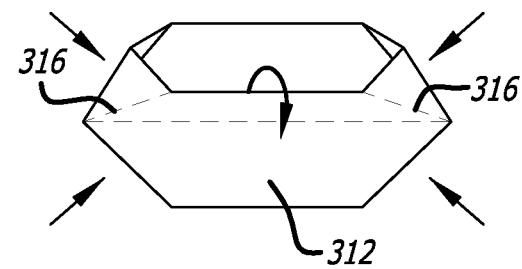
Figure 22D:
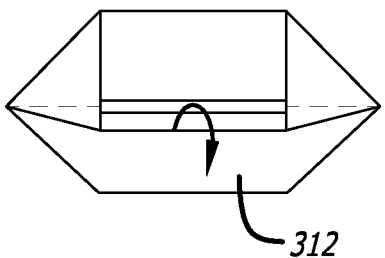
Figure 22E:
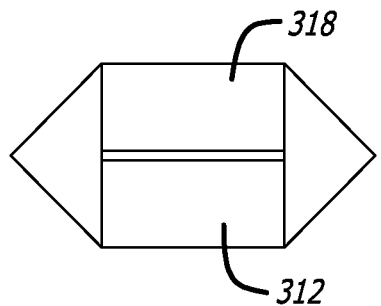

With reference to FIGS. 14-21B, another approach to a solar light assembly 200 is disclosed (See FIGS. 21A-B for completed assembly). The light assembly includes an expandable bladder 202 which is formed from a plurality of subassemblies.

A first assembly (See FIGS. 14, 17A-B) 210 is defined by a longitudinal, flat rectangular structure having a first end 212 and a second end 214. This structure is folded along fold lines 220 and joined at the first and second ends 212, 214 to form a rectangular box with open opposite ends 222, 224. A terminal end 226 of one end 212, 214 is folded over another end 212, 214 so that a weld can be created between the ends. Terminal end portions 220 of the side walls defining perimeters of the open opposite ends 222, 224 of the folded rectangular structure are provided and folded to join with further assemblies which close the open opposite ends 222, 224. The first assembly 210 can be formed from a recyclable 0.75 mil PET laminated hybrid plastic and fabric sheet material. Further, in one specific embodiment, the folded sections of the first assembly are generally 4.5×4.5 inch squares, with the terminal end portion 230 of the side walls having a 0.25 inch breadth. The terminal end 226 of the one end 212, 214 which is provided for welding purposes can also have a 0.25 inch dimension.

The second subassembly 240 (See FIGS. 15 and 18A-B) of the solar light assembly 200 is sized and shaped to enclose one open end 222 of the first assembly 210. The second assembly (See FIG. 18A for complete assembly) includes a first generally rectangular, flat component 242, a second generally rectangular, flat component 244, and a flat strip of material defining a handle 246. The first component 242 can be formed from a polyester film such as Polyart FLEX08, 0.75 mil PET. The second component 244 can embody a sheet having a mirrored printed surface or a shiny/silver surface on one side thereof. Terminal end portions 250 extending about the perimeter of each of the first and second components 242, 244 are provided for attaching the components to the first assembly 210, with the first components 242 overlaying the second component 244. To mate with the first assembly, the first and second components can have an effective width and height (excluding the terminal end portions) of 4.5 inches. When so assembled to the first assembly 210, the mirrored surface faces an interior of the resulting bladder 202. The handle 246 can be formed by the same material as the first component 242 and can also include terminal end portions 252 intended to fold over opposite sides of the first assembly 210. Thus, the handle can have an overall length of 5.0 inches and a width of 0.375 inches. In the contemplated assembly, the handle 246 is configured across a mid-section of the first component 242.

The third assembly 260 (See FIGS. 16 and 19A-B), is also sized and shaped to be attached to the first assembly 210. In this case, the third assembly is configured to enclose another open end 224 of the first assembly 210. It further includes a first generally rectangular, flat section 262 residing adjacent and connected by a fold 264 to a second generally rectangular flat section 266. When folded against each other, the first and second sections 262, 266 form a pocket for receiving a solar rechargeable light assembly 290 (See FIGS. 19B and 20B). In particular, the solar rectangular light assembly 290 is contemplated to include the LED, battery and solar panel. Again, in one particular embodiment, the third assembly 260 has an effective width and height of 4.5 inches and further includes a terminal end portion 220 (approximately 0.25 inches) extending about the perimeter of the second section 266, such structure being provided to join the third assembly 260 to the first assembly 210. This assembly can be formed from a clear PET material that has a thickness of 0.005 mil or more.

A completely assembled solar light assembly 200 is shown in FIG. 20B. As shown, the assembly has a generally rectangular prism shape. Additional fold lines 295 formed in the sides of the assembly (see dashed lines) are provided in the portion of the assembly defined by the first assembly 210. Such folds permit the assembly to be collapsed and expanded when forces (see arrows) are applied to the solar light assembly 200. The collapsed bladder 202 is best seen in FIGS. 21A-B, an end of which can be removed to provide a mechanism for expansion of the bladder 202. In this way, the assembly 200 can be shipped or stored in a collapsed state and then expanded when in use. In use, the shiny or reflective surface of the second assembly 246 reflects light generated by the solar rechargeable light assembly 290 to enhance the power of the light, and such enhanced light is diffused through the pure white walls of the bladder 202.

In a specific embodiment, the solar rechargeable light assembly 290 includes a 5V/120 MA, 0.65 W solar panel (monocrystalline silicon) having a ten year life cycle. A power storage device can be in the form of Li-ON rechargeable batteries such as a 3.7V/800 MAH device with a life cycle of 1000 charges. The LED can include 6 PCS SMD having a total of 20-22 lumens and a life cycle of 50,000 hours. The working time of the light assembly is intended to be eight continuous hours and/or bashed continue ten hours, in a working condition of −20° C. to 70° C.

Turning to FIGS. 22A-24D, yet another approach to a solar light assembly 300 is presented. As with the immediately preceding example, this solar light assembly 300 is formed from a plurality of subassemblies to form an expandable bladder 302 (See FIG. 24D). A first assembly 310 is embodied in a strip of material formed into a loop 312. The loop 312 can be made from a PET textile and ends of the strip can be heat sealed to create the loop 312. Next, the loop 312 if folded in half to make a rectangular shape, and the rectangle is folded in half lengthwise. While folded in half lengthwise, each of the corners 314 are folded over to create a triangular fold 316. Once all the corners 314 are folded, an octagonal shape results, with a square opening 318 on each side of the structure. These square openings are covered with one square sleeve containing a solar panel and circuit. The other square opening is filled with a panel which has a handle on one side and a shiny mirrored surface coating on the other side.

As shown in FIGS. 23A-B and 24A, a first square opening 312 in the first assembly 310 is covered with a second assembly 320. The second assembly 320 is a generally flat, rectangular structure that is contemplated to include a mirror or shiny surface facing an interior of the first assembly 310. As before, this surface is intended to enhance the light emitted by a solar rechargeable light assembly 350 in a third assembly 330, the third assembly including a light emitting assembly 351, a battery and a photo voltaic element (solar panel) 352. The second assembly 320 is affixed to the first assembly 310 by welding or other attachment means. A handle 322 is placed over a mid-section of the second assembly and attached to the bladder device.

A third assembly 330 is further provided and is embodied in a pocket-like structure. The third assembly is sized and shaped to cover and close a second opening 312 formed in the first assembly 310. Again, here, the third assembly 330 is attached by welding or other conventional means to the first assembly 310. Facing outwardly is a photo voltaic element 352. In this way, solar energy can be captured and turned into light energy which is reflectable and enhanced by the reflective surface of the second assembly 320 through white, transparent walls of the solar light assembly to provide a useful light source.

For a self-expanding solar lamp 300, after the first and second assemblies 320, 330 have been attached, small micro holes are punctured in the triangular panels 316 of the PET textile material. These micro punctures allow for the air to come in automatically when the handle is pulled. Thus, pulling the handle while grabbing the panel with the solar panel and gently unfolding and pulling the lamp into a cube shape, resulting in expanding the bladder 302. For the inflation hole alternative, a ⅜ inch tip is cut from a top corner of one of the triangular sides 316 of the flattened octagonal shape to form a hole. To expand the bladder 302, the side with the solar panel and also the handle side are held and pulled slightly apart, air is blown into the bladder to inflate into a cube shape.

Lights according to the disclosed subject matter offer benefits over known technology. In the wake of a natural disaster, because they are collapsible, they can be shipped in conjunction with other disaster relief supplies. Families and individuals in tent cities are in desperate need of light to improve safety at night. Children need light at night to continue their studies. Lights according to the disclosed subject matter are a cost effective improvement over flashlights and kerosene lanterns. Lights according to the disclosed subject matter are also designed to provide light to individuals with little to no access to a functioning electrical grid. In developing nations, the World Bank estimates that families spend an average of 30% of their disposable income on kerosene lamps and other forms of non-renewable lighting. Lights according to the disclosed subject matter are designed to last 3-5 years. The money families are able to save will allow them to buy food and other necessities.

Lights according to the disclosed subject matter can be used by campers and hikers in outdoor uses as a rechargeable, easy transportable light source. They are waterproof and can be used in water sport activities. They can also be used as a household pool light.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

Thus, it will be apparent from the foregoing that, while particular forms of the invention have been illustrated and described, various modifications can be made without parting from the spirit and scope of the invention.

I claim:

1. An expandable solar light, comprising:
   a generally flat, square solar panel;
   a battery;
   a light emitting assembly;
   a bladder comprising a first assembly, a second assembly and a third assembly, the assemblies being walls of the bladder;
   the first assembly having at least two faces with respective fold lines, the fold lines in each face being between opposing vertices of the face and forming an X-pattern, each face being a respective wall of the bladder;
   the second assembly being one wall of the bladder; and
   the third assembly being one wall of the bladder and having an outer pane opposite an inner pane, the outer and inner panes forming a pocket for the generally flat, square solar panel, the battery and the light emitting assembly;
   wherein the bladder is movable between
      (a) a first configuration where the faces are folded along the fold lines so that the bladder is fully collapsed, and
      (b) a second configuration where the faces are unfolded along the fold lines so that the bladder is fully expanded.

2. The expandable solar light of claim 1, wherein the battery is flat.

3. The expandable solar light of claim 1, wherein the light emitting assembly comprises light emitting diodes.

4. The expandable solar light of claim 1, wherein the first configuration of the bladder is a generally flat shape.

5. The expandable solar light of claim 1, wherein the first assembly includes four generally square faces arranged in a row with alternating faces having fold lines, the first assembly for diffusing light emitted by the light emitting assembly.

6. The expandable solar light of claim 1, wherein the second assembly is generally square, and includes an outward facing pane opposite an inward facing pane, the inward facing pane being reflective for reflecting light emitted by the light emitting assembly.

7. The expandable solar light of claim 1, wherein the first, second and third assemblies form a cube-like structure when the bladder is in the second configuration.

8. The expandable solar light of claim 7, wherein heat welds define junctions between the first, second and third assemblies.

9. The expandable solar light of claim 1, wherein the second and third assemblies are devoid of fold lines.

10. An expandable solar light comprising:
    a generally flat, square solar panel;
    a battery;
    a light emitting assembly;
    a bladder comprising a first assembly, a second assembly and a third assembly, the assemblies being walls of the bladder;
    the first assembly being four walls of the bladder and formed of a loop of material having fold lines, and having two opposing generally square openings;
    the second assembly being one wall of the bladder, being positioned in the other of the generally square openings of the first assembly, and having an outward facing pane opposite an inward facing pane, the inward facing pane being reflective for reflecting light emitted by the light emitting assembly; and
    the third assembly being one wall of the bladder, being positioned in one of the generally square openings of the first assembly, and having an outer pane opposite an inner pane, the outer and inner panes forming a pocket for the solar panel and the light emitting assembly, the solar panel on the outward facing side of the third assembly, the light emitting assembly on the inward facing side of the third assembly;
    wherein the bladder is movable between
       (a) a first configuration where the first assembly is folded along the fold lines so that the bladder is fully collapsed, and
       (b) a second configuration where the first assembly is unfolded along the fold lines so that the bladder is fully expanded.

11. The expandable solar light of claim 10, wherein the first assembly includes four inverted corners.

12. The expandable solar light of claim 10, wherein the light emitting assembly comprises light emitting diodes.

13. The expandable solar light of claim 10, further comprising a battery in the pocket of the third assembly for receiving power from the solar panel and for providing power to the light emitting assembly.

14. The expandable solar light of claim 10, wherein the first, second and third assemblies form a cube-like structure when the bladder is in the second configuration.

* * * * *